United States Patent [19]

Baatz et al.

[11] 4,012,560

[45] Mar. 15, 1977

[54] ARTICLES COATED WITH PRESSURE-SENSITIVE INTERPOLYMERS CONTAINING 2-ACRYLAMIDO-2-METHYLPROPANESULFONIC ACID

[75] Inventors: James C. Baatz, West Springfield; Albert E. Corey, East Longmeadow, both of Mass.

[73] Assignee: Monsanto Company, St. Louis, Mo.

[22] Filed: Nov. 3, 1975

[21] Appl. No.: 628,005

Related U.S. Application Data

[63] Continuation-in-part of Ser. No. 475,062, May 31, 1974, Pat. No. 3,931,087.

[52] U.S. Cl. .................. 428/474; 260/29.6 SQ; 260/79.3 MU; 428/511; 428/514; 428/516; 428/518; 428/483; 428/352
[51] Int. Cl.² .................. C09H 7/02; C09H 7/04; B32B 27/06
[58] Field of Search ............... 427/207 B; 428/335, 428/514, 521, 516, 474, 261; 260/29.6 SQ, 79.3 MU

[56] References Cited

UNITED STATES PATENTS

| | | | |
|---|---|---|---|
| 3,269,994 | 8/1966 | Horn et al. | 427/207 B |
| 3,725,122 | 4/1973 | Reinhard | 428/355 |
| 3,890,180 | 6/1975 | Grosse et al. | 260/29.6 SQ |
| 3,892,720 | 7/1975 | Johnhe | 260/79.3 MU |
| 3,927,239 | 12/1975 | Gobron | 428/355 |
| 3,931,087 | 1/1976 | Baatz | 260/29.6 HN |
| 3,931,089 | 1/1976 | Karl | 260/29.6 SQ |
| 3,931,089 | 1/1976 | Karl | 260/29.6 HN |
| 3,936,408 | 2/1976 | Adams et al. | 260/29.6 SQ |

Primary Examiner—Joseph L. Schofer
Assistant Examiner—Peter F. Kulkosky
Attorney, Agent, or Firm—R. Bruce Blance; James C. Logomasini; Edward P. Grattan

[57] ABSTRACT

Acrylic pressure-sensitive resins comprising at least one ester of acrylic acid or methacrylic acid containing from 6 to 20 carbon atoms and between 0.1 and 1.5 weight percent of 2-acrylamido-2-methylpropanesulfonic acid. The resins are prepared in aqueous emulsion and when coated on substrates and dried provide pressure-sensitive films with superior peel strength retention.

8 Claims, No Drawings

ARTICLES COATED WITH PRESSURE-SENSITIVE INTERPOLYMERS CONTAINING 2-ACRYLAMIDO-2-METHYLPROPANESULFONIC ACID

This application is a continuation-in-part of application Ser. No. 475,062 filed May 31, 1974, now U.S. Pat. No. 3,931,087.

BACKGROUND OF THE INVENTION

1. Field of the Invention

The present invention relates to aqueous emulsions of pressure-sensitive interpolymers containing 2-acrylamido-2-methylpropanesulfonic acid and to articles of manufacture comprising surfaces coated with such pressure-sensitive interpolymers.

2. Description of the Prior Art

Pressure-sensitive resins are used conventionally in the form of films to provide adhesive bonds between normally non-adhering surfaces. The films are conventionally prepared by casting them from organic solvent solutions of pressure-sensitive interpolymers and evaporating the solvent. The disadvantage of such organic solutions arises from the large quantities of organic solvent effluent which is discharged into the atmosphere. Manufacturers of pressure-sensitive articles are, therefore, switching increasingly from organic solutions to aqueous emulsions of the pressure-sensitive interpolymers to minimize atmospheric pollution.

Acrylic resins are among the interpolymers used as pressure-sensitive resins. When they are prepared in aqueous emulsion and coated on a substrate to yield a pressure-sensitive film, they exhibit poor age resistance manifested in a substantial loss of peel strength. There is, therefore, a need in the art for pressure-sensitive acrylic resin emulsions which yield pressure-sensitive films with adequate age resistance.

SUMMARY OF THE INVENTION

The above-mentioned need in the art is supplied by the present invention which provides aqueous emulsions of acrylic interpolymers containing 2-acrylamido-2-methylpropanesulfonic acid. The acrylic interpolymers possess a weight average molecular weight in the range of 10,000 to 1,000,000 and a glass transition temperature in the range of $-15°$ to $-75°$ C., and comprise:

A. between 0.1 and 1.5 weight percent of 2-acrylamido-2-methylpropanesulfonic acid in its acid form or neutralized with an alkali metal base, ammonia, or monobasic amine, B. at least one monomer selected from the group consisting of esters of acrylic acid and methacrylic acid containing from 6 to 20 carbon atoms, and C. optionally, a monomer selected from the group consisting of $\alpha$-olefins containing from 2 to 10 carbon atoms, vinyl esters of alkanoic acids containing from 3 to 10 carbon atoms, ethyl and methyl esters of acrylic and methacrylic acids, acrylonitrile, methacrylonitrile, styrene, vinyl toluene, and vinyl chloride.

The invention provides a process for preparation of the aqueous emulsions of acrylic pressure-sensitive resins and a process for improving the age resistance of the resins. In another aspect of the invention, pressure-sensitive articles of manufacture are obtained by coating one or more surfaces with the pressure-sensitive interpolymer composition.

DESCRIPTION OF THE INVENTION

The interpolymer comprises monomers selected from the Groups A, B, and C described above. Between 0.1 and 1.5 weight percent of 2-acrylamido-2-methylpropanesulfonic acid is effective to provide age resistance to the interpolymer, the preferred range being 0.25 to 1.0 weight percent. The interpolymer may be obtained by interpolymerization with 2-acrylamido-2-methylpropanesulfonic acid in the acid form or neutralized with an alkali metal base, ammonia or a monobasic amine of molecular weight in the range 31 to 300. Sufficient base is preferably present in the aqueous polymerization medium or is added after polymerization to provide an emulsion interpolymer with a pH in the range 4 to 8.

Group B monomers include the esters of acrylic and methacrylic acid containing from 6 to 20 carbon atoms. Preferred esters contain branched chain alkyl groups such as isobutyl acrylate, 2-ethylhexyl acrylate and 2-ethylhexyl methacrylate. The pressure-sensitive resin need only contain monomers from Groups A and B. However, optionally, monomers from Group C may also be present. Group C includes $\alpha$-olefins containing from 2 to 10 carbon atoms such as ethylene and n-decene-1, vinyl esters of alkanoic acids containing 3 to 10 carbon atoms such as vinyl acetate and vinyl octoate, ethyl and methyl esters of acrylic and methacrylic acids, acrylonitrile, methacrylonitrile, styrene, vinyl toluene, and vinyl chloride. Preferred monomers of Group C include methyl acrylate, ethyl acrylate and vinyl acetate because substantial amounts of them may be used without causing a drastic increase in the glass transition temperature of the interpolymer.

The ratio of monomers in the interpolymer is selected so that the glass transition temperature is in the range of $-15°$ to $-75°$ C. A suitable ratio is conventionally calculated from the equation:

$$\frac{1}{T_g} = \frac{W_1}{T_{g1}} + \frac{W_2}{T_{g2}} + \cdots \frac{W_n}{T_{gn}}$$

where $T_g$ is the glass transition temperature of the interpolymer expressed as degrees Kelvin, $T_{g1}$, $T_{g2}$, etc. are the glass transition temperatures of the homopolymers of the respective comonomers and $W_1$, $W_2$, etc. are the weight fractions of comonomers required for a specific glass transition temperature of the interpolymer. Glass transition temperatures are determined experimentally by means of the duPont Differential Thermal Analyzer, Model 900, with sample size of $50 \pm 5$ mg. and heating rate of 20° C. per minute.

The weight average molecular weight of the interpolymer is in the range of 10,000 to 1,000,000, corresponding to a relative viscosity in the range of 1.3 to 12.0 measured on the salt form of the interpolymer neutralized with sodium hydroxide, in a benzene solution containing 2 grams of salt per deciliter of solution. The preferred molecular weight range is from 50,000 to 700,000, providing adequate cohesive strength and pressure sensitivity.

The emulsion polymerization is carried out by conventional methods with water-soluble or oil-soluble free radical initiator systems or with redox initiator systems in the presence of anionic and non-ionic surfactants. The amount of surfactant is sufficient to give an average size to the emulsion particles in the range of from 0.1 to 0.8 micron. The amount of surfactant is usually in the range of from 0.5 to 3.0 percent of the aqueous emulsion. In comparison with emulsion interpolymers which do not contain 2-acrylamido-2-methylpropanesulfonic acid, the amount of surfactant may be reduced to as low as 0.1 percent to take advantage of the surfactant effect of the acid monomer and its salts, but the emulsifier cannot be entirely eliminated without causing instability and coagulation of the emulsion. The concentration of interpolymer in the emulsion is in the range 30 to 70 percent and preferably 40 to 60 percent to provide adequate viscosity for ease of coating and sufficient solids content for economy.

The following Examples illustrate the preparation, formulation, and testing of the special interpolymers which are to be used in the practice of this invention and are not to be construed as limitations thereof. All parts and percentages are by weight unless otherwise specified and the expressions, "polymer" and "interpolymer" are used interchangeably.

PREPARATION OF INTERPOLYMERS

EXAMPLE 1

This Example illustrates the preparation of an emulsion interpolymer comprising 65 parts 2-ethylhexyl acrylate, 34.5 parts vinyl acetate, and 0.5 parts 2-acrylamido-2-methylpropanesulfonic acid.

The polymer is prepared in a kettle equipped with a stirrer, condenser, holding tanks and pumps.

| AMOUNT OF INGREDIENTS, Parts by Weight | | | |
|---|---|---|---|
| | Initial Charge | Subsequent Charges 1 | 2 |
| Water | 217.9 | 35.7 | 169.0 |
| Surfactant A[1] | | | 2.3 |
| Surfactant B[2] | | 11.0 | |
| Sodium Bicarbonate | 1.3 | | |
| Sodium Hydroxide | | 0.54 | |
| Potassium Persulfate | 2.5 | | |
| 2-Ethylhexyl Acrylate | | | 358.0 |
| Vinyl Acetate | | | 189.3 |
| 2-Acrylamido-2-Methyl-propanesulfonic Acid | | 2.75 | |

[1]Surfactant A - Sodium Dioctyl Sulfosuccinate
[2]Surfactant B - The sulfate ester of a nonylphenol ethylene oxide condensate containing an average of 30 ethylene oxide units per molecule of condensate.

Seven percent of Charge 1 and five percent of Charge 2 are added to the initial charge. The batch is heated to 75° C. and the remainder of Charges 1 and 2 are added at a constant rate over 3 hours. The polymerization temperature ranges from 78° to 82° C. The emulsion interpolymer contains 54.8 percent solids and has a Brookfield Viscosity of 3,340 cps. and a pH of 4.7.

EXAMPLES 2–11

The general procedure of Example 1 is followed except that different monomers and monomer ratios are used in order to illustrate a variety of interpolymers.

TABLE 1

| | COMPOSITIONS OF INTERPOLYMERS PREPARED IN EXAMPLES 1 to 11 | | | |
|---|---|---|---|---|
| Ex. | Monomeric Components | Weight Ratio | Solids, % | Brookfield Viscosity |
| 1 | EHA/VAc/AMPS | 65/34.5/0.5 | 54.8 | 3,340 |
| 2 | EHA/VAc/AA | 65/34.5/0.5 | 53.9 | 992 |
| 3 | EHA/VAc/AMPS | 65/34.75/0.25 | 52.8 | 590 |
| 4 | EHA/VAc/AA | 65/34.75/0.25 | 53.4 | 1,000 |
| 5 | EHA/VAc | 65/35 | 53.5 | 1,960 |
| 6 | EHA/VAc/AMPS | 59.3/39.7/1.0 | 54.3 | 1,840 |
| 7 | EHA/IBA/VAc/AMPS/AA | 65/15/19/0.5/0.5 | 57.7 | 852 |
| 8 | EHA/VAc/AMPS | 70/29.5/0.5 | 54.2 | 1,920 |
| 9 | EHA/VAc/AMPS | 76.0/23.5/0.5 | 53.4 | 2,900 |
| 10 | EHA/VAc/AMPS | 76.0/22.0/2.0 | 53.2 | 980 |
| 11 | EHA/VAc/AMPS | 76.0/18.25/5.75 | 52.9 | 1,480 |

LEGEND
EHA  2-ethylhexyl acrylate
VAc  vinyl acetate
AMPS  2-acrylamido-2-methylpropanesulfonic acid
AA  acrylic acid
IBA  isobutyl acrylate

EVALUATION OF PRESSURE-SENSITIVE RESIN EMULSIONS

In the evaluation of pressure-sensitive resin emulsions, the emulsions are coated on silicone release paper to provide 1.5±0.3 milligrams of dry film per square centimeter. The film is dried at room temperature for 10 minutes and at 90° C. for three minutes. It is then applied to a strip of polyvinyl chloride 5.08 cm wide and 0.076 mm thick and pressed to the polyvinyl chloride film by application of a 2.04 kg rubber roller which meets the specifications of the Pressure-Sensitive Tape Council. The vinyl film is cut into two strips 2.54 cm wide. The silicone release paper is removed and the vinyl film is bonded by means of the pressure-sensitive coating to a stainless steel surface by applying pressure with the 2.02 kg roller. The bond is aged for 20 minutes at 22° C. and 50 percent relative humidity. One end of the vinyl strip is peeled from the stainless steel surface and clamped in the jaws of an Instron Tensile Tester. The vinyl strip is then peeled at an angle of 180° from the stainless steel surface at a rate of 30.48 cm/min. Peel strength is reported in grams per centimeter of width.

Release paper coated with the adhesive and joined to polyvinyl chloride film as above is aged at 90° C. for 48 hours. The peel strength determination is then carried out as set forth above. The difference in peel strength of the aged and unaged samples indicates the age resistance of the pressure-sensitive interpolymer adhesive. A drop in peel strength to less than 100 grams per cm or a loss of more than 50 percent is considered to be unacceptable. The data are set forth in Table 2.

TABLE 2

| | Polyvinyl Chloride/Stainless Steel (g/cm). | | % Loss in Peel |
|---|---|---|---|
| Ex. | 0 Age | 48 hrs., 90° | |
| 1 | 206 | 179 | 13.0 |
| 2 | 215 | 93 | 56.7 |
| 3 | 206 | 136 | 33.9 |
| 4 | 268 | 98* | 63.3 |
| 5 | 331 | 98* | 70.2 |
| 6 | 118 | 102 | 13.6 |
| 8 | 322 | 179 | 44.4 |
| 9 | 256 | 152 | 40.6 |
| 10 | 188 | 70 | 62.9 |
| 11 | 125 | 14 | 88.6 |

*18 Hrs., 90°

Examples 1, 3, 6, 8 and 9 illustrate the superior resistance of the compositions of the present invention to loss of peel strength on aging at 90° C. in comparison with the severe loss observed with interpolymers of 2-ethylhexyl acrylate and vinyl acetate unmodified, modified with higher concentrations of 2-acrylamido-2-methylpropanesulfonic acid and modified with acrylic acid.

The compositions of the present invention may be used as the adhesive component in pressure-sensitive tapes, films and foams. They adhere well to resin surfaces such as plasticized poly(vinyl chloride), Mylar, cellulose acetate, nylon, polyethylene and polypropylene, as well as to paper, metal and painted surfaces. They are especially useful as the adhesive component of decorative vinyl sheets, decals, vinyl foam and tiles.

Articles of manufacture such as tapes, decals, decorative vinyl sheets and transfer films containing the pressure-sensitive resin composition of the present invention are prepared by coating the resin on the appropriate substrate by conventional coating methods. Such articles conventionally include a release paper for temporary protection of the adhesive film until the final adhesive bond is made. The thickness of the adhesive film is generally in the range of 5 to 125 microns.

Application of the film to the substrate is conventionally carried out on roll coaters such as reverse roll and gravure roll coaters. The resin emulsion viscosity is adjusted to between 25 and 5,000 centipoises with higher viscosities within the range preferred for reverse roll coating and lower viscosities within the range preferred for gravure coating. The coatings are applied to the substrate moving through the rolls at a rate of between 3.05 meters per minute and 305 meters per minute.

While the present invention has been described with particular reference to certain specific embodiments thereof, it will be understood that certain changes, substitutions and modifications may be made therein without departing from the scope thereof. This invention also contemplates the use of fillers, extenders, stabilizers, antioxidants, plasticizers, tackifiers, flow control agents, adhesion promoters, dyes, etc. in the pressure-sensitive resin emulsions and the pressure-sensitive resins of this invention.

What is claimed is:

1. An article of manufacture comprising a substrate coated on at least one side with a pressure-sensitive interpolymer comprising:
   A. from 0.1 to 1.5 weight percent of 2-acrylamido-2-methylpropanesulfonic acid, and
   B. at least one monomer selected from the group consisting of esters of acrylic acid and methacrylic acid containing from 6 to 20 carbon atoms, alone, or with
   C. a monomer selected from the group consisting of alpha-olefins containing from 2 to 10 carbon atoms, vinyl esters of alkanoic acids containing from 3 to 10 carbon atoms, ethyl and methyl esters of acrylic and methacrylic acids, acrylonitrile, methacrylonitrile, styrene, vinyl toluene, and vinyl chloride, wherein the interpolymer has a weight average molecular weight in the range 10,000 to 1,000,000 and a glass transition temperature in the range of −15° to −75° C.

2. The article of manufacture of claim 1 wherein the Group B comonomer is selected from the group consisting of isobutyl acrylate, 2-ethylhexyl acrylate and 2-ethylhexyl methacrylate.

3. The article of manufacture of claim 1 wherein the Group C monomer is vinyl acetate, methyl acrylate, or ethyl acrylate.

4. The article of manufacture of claim 1 wherein the interpolymer contains from 0.25 to 1 weight percent of 2-acrylamido-2-methylpropanesulfonic acid.

5. The article of manufacture of claim 1 wherein the interpolymer has a molecular weight between 50,000 and 700,000.

6. The article of manufacture of claim 1 wherein the substrate is a tape.

7. The article of manufacture of claim 1 wherein the substrate is a sheet.

8. The article of manufacture of claim 1 wherein the substrate is selected from the group consisting of plasticized polyvinyl chloride, Mylar, cellulose acetate, nylon, polyethylene, polypropylene, and paper.

* * * * *